US012764196B2

(12) United States Patent
Huang et al.

(10) Patent No.: US 12,764,196 B2
(45) Date of Patent: Oct. 13, 2026

(54) REAL-TIME ELECTRONIC SERVICE PROCESSING ADJUSTMENTS

(71) Applicant: PayPal, Inc., San Jose, CA (US)

(72) Inventors: Shitong Huang, Shanghai (CN); Xiaoling Zhang, Shanghai (CN); Silu Tan, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 82 days.

(21) Appl. No.: 19/010,928

(22) Filed: Jan. 6, 2025

(65) Prior Publication Data

US 2025/0227157 A1 Jul. 10, 2025

Related U.S. Application Data

(63) Continuation of application No. 17/622,666, filed as application No. PCT/CN2021/139109 on Dec. 17, 2021, now Pat. No. 12,200,076.

(51) Int. Cl.

| | |
|---|---|
| ***G06F 15/173*** | (2006.01) |
| ***G06F 21/55*** | (2013.01) |
| ***H04L 67/50*** | (2022.01) |

(52) U.S. Cl.
CPC .......... *H04L 67/535* (2022.05); *G06F 21/552* (2013.01); *G06F 21/554* (2013.01)

(58) Field of Classification Search
CPC ..... H04L 67/535; G06F 21/552; G06F 21/554
See application file for complete search history.

(56) References Cited

U.S. PATENT DOCUMENTS

| | | | | |
|---|---|---|---|---|
| 10,432,605 | B1 | 10/2019 | Lester | |
| 11,295,370 | B1 | 4/2022 | Priyadarshini | |
| 2009/0222369 | A1 | 9/2009 | Zoldi | |
| 2015/0142506 | A1 | 5/2015 | Kumar | |
| 2018/0033009 | A1 | 2/2018 | Goldman | |
| 2020/0111037 | A1 * | 4/2020 | Mondal | H04W 4/025 |

FOREIGN PATENT DOCUMENTS

| | | | |
|---|---|---|---|
| CN | 103236005 | A | 8/2013 |
| CN | 104200152 | A | 12/2014 |

OTHER PUBLICATIONS

International Appl. No. PCT/CN2021/139109, International Preliminary Report on Patentability mailed Jun. 27, 2024, 5 pages.
Intemational Search Report and Written Opinion for Application No. PCT/CN2021/139109 mailed on Sep. 15, • 022, 9 pages.

* cited by examiner

*Primary Examiner* — John B Walsh
(74) *Attorney, Agent, or Firm* — HAYNES AND BOONE, LLP

(57) ABSTRACT

Systems and methods for real-time electronic service processing adjustments are disclosed. In an embodiment, a computer system may determine that a user account activity has triggered an assessment checkpoint from a plurality of assessment checkpoints in a life cycle of a user account. The computer system may retrieve data from the assessment checkpoint and update a lifetime score for the user account based on the retrieved data. The computer system may update the lifetime score by weighting the retrieved data as one or more features in a linear-weighted lifetime score model, for the life cycle. The computer system may adjust a response threshold for the assessment checkpoint based on the updated lifetime score.

20 Claims, 4 Drawing Sheets

REAL-TIME ELECTRONIC SERVICE PROCESSING ADJUSTMENTS

CROSS REFERENCE TO RELATED APPLICATION

The present invention is a Continuation of U.S. patent application Ser. No. 17/622,666, filed Feb. 28, 2023, which is a U.S. National Stage patent application under 35 U.S.C. § 371 of International Patent Application No. PCT/CN2021/139109 filed Dec. 17, 2021 and entitled "REAL-TIME ELECTRONIC SERVICE PROCESSING ADJUSTMENTS," which are incorporated herein by reference in their entirety.

TECHNICAL FIELD

The present disclosure generally relates to electronic service processing and more particularly to using a lifetime score for a user account to make real-time adjustments of electronic service processing rules responsive to user account activity according to various embodiments.

BACKGROUND

Machine learning and artificial intelligence techniques can be used in various aspects of decision making. Machine learning techniques often involve using available data to construct a model that can produce an output (e.g., a decision, recommendation, prediction, etc.) based on particular input data. Training data (e.g., known/labeled data and/or previously classified data) may be used such that the resulting trained model is capable of rendering a decision on unknown data. Electronic service providers may use machine learning and artificial intelligence to evaluate requests for electronic services associated with user account activities of user accounts serviced by the electronic service providers. Using various input data, machine learning models may output one or more scores associated with a user account activity, where each score may quantify the user account activity, such as, for example, indicate a risk that the user account activity should not be processed or otherwise canceled. Electronic processing rules may filter electronic service requests based on these scores. However, these electronic processing rules are often too rigid, generally siloed between different types of user account activities, and not responsive to user activity in a fast-paced electronic service environment in which user actions require electronic processing rules to quickly change. Thus, the present disclosure provides systems and methods for real-time electronic service processing adjustments that allow for processing rules to be more flexible and considerate of other user account activities of a user account.

Figure 1:
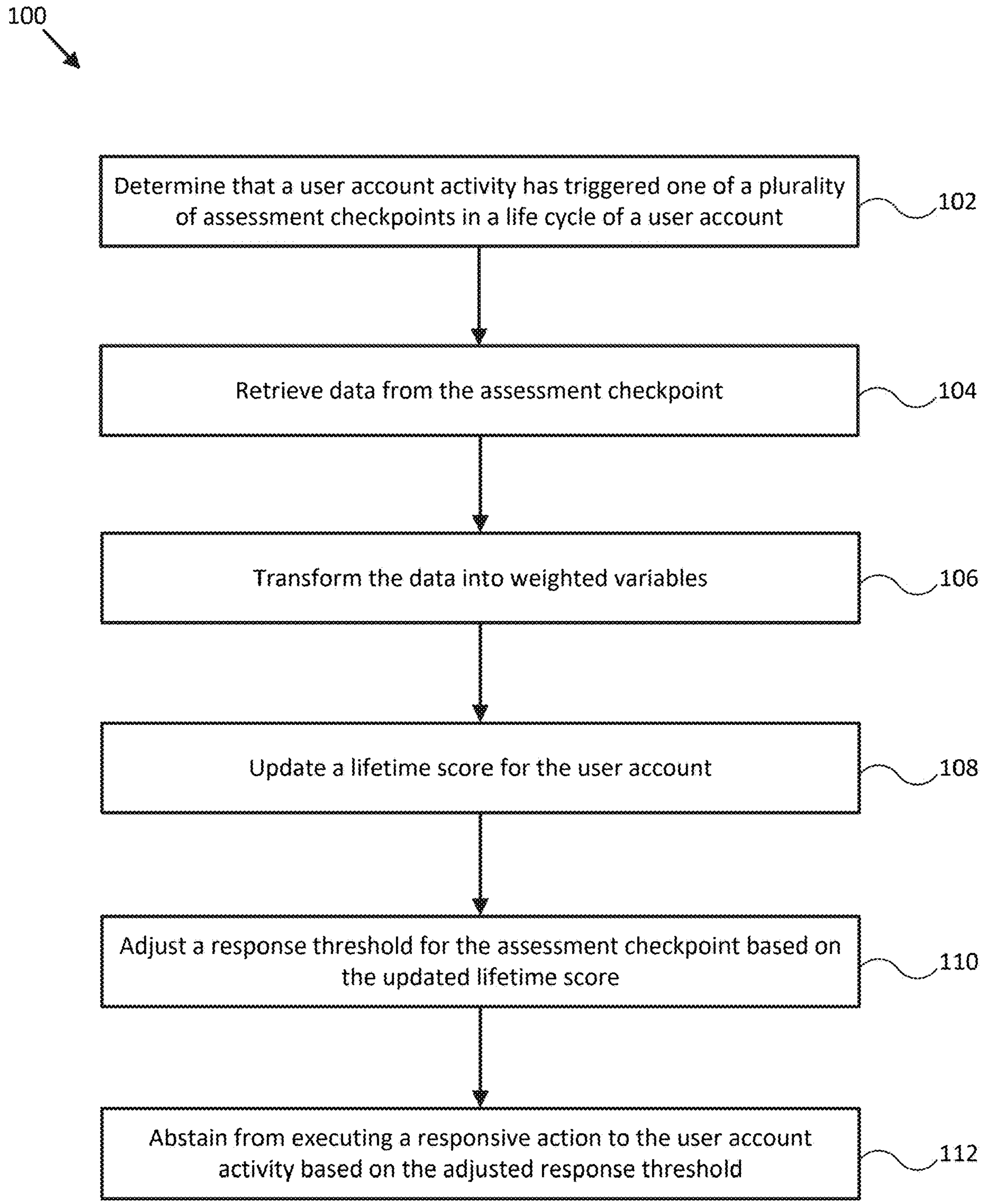
FIG. 1 illustrates a flow diagram of a process for adjusting electronic service processing rules at assessment checkpoints in real-time using a lifetime score for a user account in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

User accounts may interact with other user accounts, as well as a service provider, in various systems. These accounts may in some instances be used to perform electronic transactions or other electronic interactions with one another using electronic services provided by an electronic service provider. In some cases, electronic transactions may include transferring ownership of an asset (e.g., file permissions within a file system, digital ownership rights, an electronic payment transaction, or transfer of another electronic asset). When these transactions are recorded in a log and/or a database, a history of the transactions is developed. Certain account and transaction patterns may be indicative of certain types of actions performed by the user accounts, and in some cases, these actions may violate authorized use policies (AUPs) or otherwise be illegal and/or undesired by system owners. Identifying such patterns via human analysis may be difficult or impossible, however, especially as digital transactions and fraud become more and more prevalent.

Machine learning and artificial intelligence techniques can identify accounts and/or interactions that may be violating terms of service, committing a security violation, and/or performing illegal actions in a way that is not easily ascertainable (or impossible to ascertain) from human analysis. Such identification may be provided in the form of risk scores or other scores that indicate how likely the account and/or interaction is engaged in said actions and/or how confident that the scoring mechanism is in stating that the account and/or interaction is engaged in said actions.

These machine learning and artificial intelligence techniques can be used in combination with processing rules to filter out certain electronic user activities from processing queues. For example, a processing rule may be optimized to reduce the number of chargeback transactions that are fully processed for a user account as a chargeback transaction may result in a cancelation of the transaction, which causes unnecessary use of computer processing resources. Further, the processing rules may be optimized to reduce the number of false-positive chargeback transactions that are rejected, which causes unnecessary computer processing operations to correct and causes additional processing delays.

In some situations, it may be desirous for the electronic service provider to adjust the processing rules for certain individuals so that they experience no or fewer processing delays in their user activities due to the assessment checkpoints that trigger when the user engages in certain user activities. For example, if the user is engaged in a transaction where a risk score calculated at an assessment checkpoint for the transaction could be used to reject the transaction for the user, the electronic service provider may adjust a response threshold for a processing rule at the assessment checkpoint such that the transaction is not rejected. An electronic service provider may want to reduce these user experience friction points for users who are important to the electronic service provider, such as users who frequently use the electronic service provider's services or use the electronic service provider's services in a valuable way to the electronic service provider.

For example, in one embodiment, a computer system may monitor user account activity (e.g., a real-time updated user account history/log) to determine that a particular user account activity has triggered an assessment checkpoint. The computer system may retrieve data from the assessment checkpoint, such as by retrieving decision engine output(s) from a risk assessment computer system that analyzes a riskiness of the particular user account activity that triggered the assessment checkpoint. The computer system may use the retrieved data to update a lifetime score for the user account, where the lifetime score is an evolving score that persists over a life cycle of the user account and reflects user account activities from a holistic viewpoint rather than in isolation at the various assessment checkpoints. In some cases, the computer system may compute the update to the lifetime score by weighting the retrieved data as one or more features in a linear-weighted lifetime score model for the life cycle. Based on the updated lifetime score, the computer system may adjust a response threshold for the assessment checkpoint such that a responsive action that would otherwise be performed at the assessment checkpoint due to a risk score calculated by the risk assessment computer system can be prevented.

Conventionally, the analysis of the user account activity would be performed in isolation by the risk assessment computer system. Thus, the responsive action would be taken due to the risk score meeting the response threshold. However, by using a lifetime score for the user account that is continuously updated at various assessment checkpoints, certain responsive actions to user account activities can be eliminated or modified such that the user is given a frictionless user experience and computer resources that would otherwise be expended in performing the responsive actions can be preserved and/or allocated to other computer tasks.

Further details and additional embodiments are described below in reference to the accompanying figures.

Referring now to FIG. 1, illustrated is a flow diagram of a process 100 for electronic service processing adjustments in accordance with one or more embodiments of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed in various embodiments.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

A computer system may perform the operations of process 100 in accordance with various embodiments. The computer system may include a non-transitory memory (e.g., a machine-readable medium) that stores instructions and one or more hardware processors configured to read/execute the instructions to cause the computer system to perform the operations of process 100. In various embodiments, the computer system may include one or more computer systems 400 of FIG. 4.

An electronic service provider may service a plurality of user accounts. The user accounts may make various electronic service requests to the electronic service provider, to which the electronic service provider may respond by providing the requested electronic service. Generally, a service request may be considered a user account activity for a user account. User account activities for a user account may be tracked/logged by the electronic service provider in a user account history for the user account. In some embodiments, the computer system may write the data corresponding to such user account activities to a cache or database and link the data to a key representing the user account so that lookup, polling, querying, and other such operations can be performed on the data using the key. The computer system may store such user account activities associated with the user account during a life cycle for the user account. The life cycle may be a predefined period of time for the user account, such as a month, a week, or longer periods such as from a beginning of the user account's existence (e.g., registration) to a present day.

In some embodiments, as the user account engages in various user account activities throughout the life cycle of the user account, the electronic service provider may perform various assessment checkpoints for certain user account activities. Assessment checkpoints may be instances where the electronic service provider may evaluate the user account activity to determine whether any actions should be taken against the user account (e.g., restricting or limiting the user account, delaying processing of the user account activity, requesting further authentication or authorization from the user, and/or other remedial or security-based actions). As an illustration, at an assessment checkpoint, if a user account is determined to be engaging in a fraudulent electronic transaction, the electronic service provider may stop the processing of the fraudulent electronic transaction or otherwise reject the electronic transaction.

At the assessment checkpoints, the electronic service provider's actions may be computer automated. For example, at an assessment checkpoint, the computer system may calculate a score associated with the user account activity, compare the score to a response threshold, and based on the score meeting the response threshold, automatically perform the responsive action. Each assessment checkpoint may use one or more scores and response thresholds to determine whether a corresponding responsive action at the assessment checkpoint should be executed. Examples of different scores may include transaction risk scores, IP address risk scores, mobile phone risk scores, emulator risk scores, fake email risk scores, geolocation risk scores, and other scores that quantify a riskiness or other quality of the user account activity at the assessment checkpoint.

As an illustration, consider an electronic transaction user account activity. The electronic service provider may have an assessment checkpoint configured to execute for electronic transaction user account activities. The assessment checkpoint may have a processing rule for the electronic transaction that relates to an IP address risk score. The processing rule may state that electronic transactions that have an IP address risk score that meets a response threshold should be rejected (e.g., not processed for the user account making the request to process the electronic transaction), while electronic transactions that have an IP address risk score that does not meet the response threshold should be approved (e.g., fully processed). The IP address risk score may be calculated based at least in part on an IP address corresponding to a counterparty end user in the electronic transaction. As a further illustration, the processing rule for the IP address risk score may reject transactions that have an IP address risk score that is greater than a 0.80 response threshold. The IP address risk scores may be determined for each transaction in real-time by a decision engine of a risk assessment computer system managed by the electronic service provider in some embodiments. The risk assessment computer system may be part of the computer system that performs the process 100 in various embodiments.

Processing rules may be based on more than two thresholds. For example, there may be a third threshold that is between the threshold for rejecting a transaction and the threshold for processing the transaction. A risk score that is between these two thresholds, e.g., within a range of the third threshold, may result in a responsive action where additional data or security is requested before the transaction can be completed in some cases. For example, additional authentication security challenges, authorization, and/or confirmation steps may be performed before the transaction can be processed, all of which may add to friction in a user experience for a user. Accordingly, this threshold may be adjusted as further discussed herein based on a lifetime score for a user account.

While reference is made herein to transactions for simplicity of explanation, it will be appreciated that assessment checkpoints may generally be used for other user account activities. Further, while reference is made herein to scores, other types of processing rule variables are also contemplated, such as transaction amounts (e.g., currency amount for a transaction, a number of items in a transaction) and geolocations. For example, a processing rule at an assessment checkpoint may have a response threshold that defines the currency amount over which a transaction will be rejected for presumably being fraudulent (e.g., a $1B transaction may be rejected as presumably being fraudulent if a processing rule has a response threshold of $100 k over which transactions are rejected). As another example, a processing rule for geolocations may have a filter that has a response threshold defined by a geofence in which counterparty end users must be located (e.g., user device location) in order for the user account activity to be processed. These and other response thresholds as discussed herein may be adjusted by the computer system according to various embodiments.

At block 102 of process 100, the computer system may determine that a user account activity has triggered one of a plurality of assessment checkpoints during a life cycle of a user account. Examples of user account activities that may trigger an access checkpoint may include electronic service requests such as electronic transactions (e.g., a peer-to-peer transaction or a customer-merchant transaction), user account logins, communications with the electronic service provider or other user accounts (e.g., via chat bot, email, phone call, text message, video call, etc.), profile changes such as adding/editing a bank account, adding/editing a funding instrument (e.g., credit card), adding/editing a mailing or billing address, adding/editing an email address, adding/editing a phone number, depositing funds, funding a point-of-sale device, making a funds withdrawal attempt, and so forth.

In one embodiment, to determine whether a user account activity has triggered one of the plurality of assessment checkpoints, the computer system may periodically query/poll a cache or database where a user account activity history is stored and request responses as to whether there have been updates related to user account activity that would trigger an assessment checkpoint. In one embodiment, the computer system may query/poll the cache or database using an account identifier such as the key associated with the user account to retrieve the user account activity history. The user account activity history may be updated frequently by the electronic service provider's server system to provide a real-time history of each of the user account activities that a user has engaged in over the lifecycle of his/her user account.

When the computer system receives a response indicating that the user account has engaged in a user activity that triggers an assessment checkpoint, the computer system may retrieve data from the assessment checkpoint at block 104. For example, the computer system may access one or more data outputs from one or more decision engines associated with the assessment checkpoint, which may have been stored in a cache or database in association with the user account activity. For example, the decision engine outputs may include one or more scores or other metrics calculated at the assessment checkpoint, which may dictate how the user account activity is processed at the assessment checkpoint based on the processing rule(s) at the assessment checkpoint as discussed above.

At block 106, the computer system may transform the retrieved data into weighted variables, which can be used in updating a lifetime score for the user account. For example, where the data includes a continuous numerical feature, such as a score value within a particular value range, the numerical score value may be grouped into one of several bins to provide a value for a dummy variable used in a lifetime score model. Several dummy variables may be used in the lifetime score model for data retrieved at certain assessment checkpoints in some cases. Using several dummy variables may allow the numerical value range variance to be mitigated. As used herein, dummy variables may refer to qualitative variables that can take the value 0 or 1 to indicate the absence or presence of a specific condition or characteristic. The dummy variables may be used to sort data into mutually exclusive categories. In some embodiments, bins may be used to determine dummy variable values. As an illustration, where a score is a numerical score value of 0.8, it may be placed into one of several bins: (−1000.0, 0.0], (0.1, 0.2], and (0.2, 1.0]. In this illustration, 0.8 would be placed in (0.2, 1.]. Thus, a dummy variable for the bin (0.2, 1] may have a value of 1 to indicate a presence for the data feature while dummy variables for the bins (−1000.0, 0.0] and (0.1, 0.2] may have a value of 0. The above bins provided in interval notation are provided as non-limiting examples.

Categorical features may also be converted into dummy variables for use in the lifetime score model. For example, at an assessment checkpoint for when a user is adding a funding instrument to his/her user account, a fund type data point retrieved from the assessment checkpoint may be converted to dummy variables such as fund_type_I, fund-_type_W, and fund_type_b, where each may have a 0 or 1 value to represent an absence or presence of the fund type.

At block 108, the computer system may update a lifetime score for the user account. For example, it may be assumed that the data points retrieved from the assessment checkpoint, and other assessment checkpoints where data have been retrieved, satisfy a linear regression (e.g., multiple linear regression):

$$\Delta y_t = \sum_i w_i \cdot x_{it}$$

where w is a weight for independent variable x, and where the model score y at time t may be:

$$y_t = y_{t-1} + \Delta y_t$$

The data features may be linear-weighted such that the independent variables x at times t may be the accumulated value from the beginning of the lifecycle for the user account to the current time as follows:

$$y_T = \sum_0^T \left( \sum_i w_i \cdot x_{it} \right) = \sum_0^I \left( w_i \cdot \sum_T x_{it} \right)$$

In some embodiments, to standardize the raw score $y_T$, the computer system may pass the weighted sum of data features through an activation function that maps values to between 0 and 1. For example, the activation function may be a sigmoid function as follows:

$$y'_T = \text{sigmoid}(y_T) = \frac{1}{1 + e^{-y_t}},$$

where the sigmoid function may output a curve known as a sigmoid curve or an S-curve.

Thus, in some embodiments, a time-series model may be converted into a generalized linear regression, and the computer system may solve the problem using logistic regression to determine an updated lifetime score for the user account. Thus, in some cases, the lifetime score may be a categorical value such as 0 or 1, YES—HIGH VALUE or NO—NOT HIGH VALUE, etc. In some embodiments, the lifetime score may represent a status of the user account for the electronic service provider. For example, the user account may have a high value to the electronic service provider. In some cases, the user account may be highly valuable to the electronic service provider as the user account frequently uses the electronic service provider's electronic services and/or is likely to be a high-profit-margin user account for the electronic service provider.

At block 110, the computer system may adjust a response threshold for the assessment checkpoint based on the updated lifetime score. For example, as discussed above, the assessment checkpoint may have one or more associated processing rules that dictate how the user activity will be handled at the assessment checkpoint, including whether to execute any computer automated responses. In one example, the computer system may determine that the updated lifetime score meets a threshold value or, if categorical, is a certain category such as YES—HIGH VALUE, which may indicate that the user account is of a high value for the electronic service provider. Since the user account is of high value to the electronic service provider, it may be desired to reduce processing friction in the user experience for the user account. Thus, a response threshold for the assessment checkpoint that may affect how the user account activity is processed may be adjusted such that the user does not experience any lag or disruption in their user account activity.

For example, at block 112, the computer system may abstain from executing a responsive action against the user account activity based on the adjusted response threshold. To illustrate, consider an assessment checkpoint wherein the user account activity may produce a risk score at the assessment checkpoint that meets a response threshold that should normally result in the user account activity being rejected. However, based on the updated lifetime score exceeding a threshold, or being of a certain category, indicating that the user account is a high value user account, the response threshold at the assessment checkpoint may be adjusted such that the risk score that would otherwise meet the response threshold at the assessment checkpoint may no longer meet said response threshold. Consequently, the user account activity may continue to be processed by the electronic service provider without the responsive action being taken against the user account activity, which may reduce processing lag and limit/remove any disruption or delays in the user experience for the user account partaking in the user account activity.

As an illustrative use case, consider a user account that is conducting an electronic transaction using electronic services provided by the electronic service provider. A risk score computed at an assessment checkpoint for the electronic transaction may meet a response threshold for a processing rule at the assessment checkpoint, which indicates that the electronic transaction should be rejected (e.g., not processed by the electronic service provider). However, a lifetime score for the user account may also be updated when the assessment checkpoint is triggered, which can provide a "second look" to evaluate whether the electronic transaction should still be rejected. For example, if the updated lifetime score exceeds a threshold, or corresponds to a certain category, indicating that the user account is of a high value to the electronic service provider, the computer system may adjust the response threshold for the processing rule at the assessment checkpoint such that the risk score no longer meets the threshold for the processing rule. Thus, any responsive action at the assessment checkpoint due to the risk score meeting the response threshold for the processing rule may be avoided.

In some embodiments, instead of adjusting the response threshold at an assessment checkpoint, the computer system may simply abstain from executing a responsive action to the user account activity at the assessment checkpoint, based on the updated lifetimes score exceeding the threshold, or corresponding to the certain category, that indicates that the user account is a high value user account. In other embodiments, instead of adjusting the response threshold at an assessment checkpoint, the computer system may also adjust a risk score for the assessment checkpoint, based on the updated lifetime score, such that the risk score no longer meets the response threshold and does not trigger a responsive action at the assessment checkpoint.

In some embodiments, instead of abstaining from executing a responsive action to the user account activity at the assessment checkpoint, the compute system may perform other actions to reduce processing friction in the user experience for the user account. For example, a processing timeframe for the user account activity may be accelerated to provide a quicker result for the user account. In some cases, the user account activity for the user account may be moved to faster processing queues to reduce any waiting time for the user account.

Figure 2:
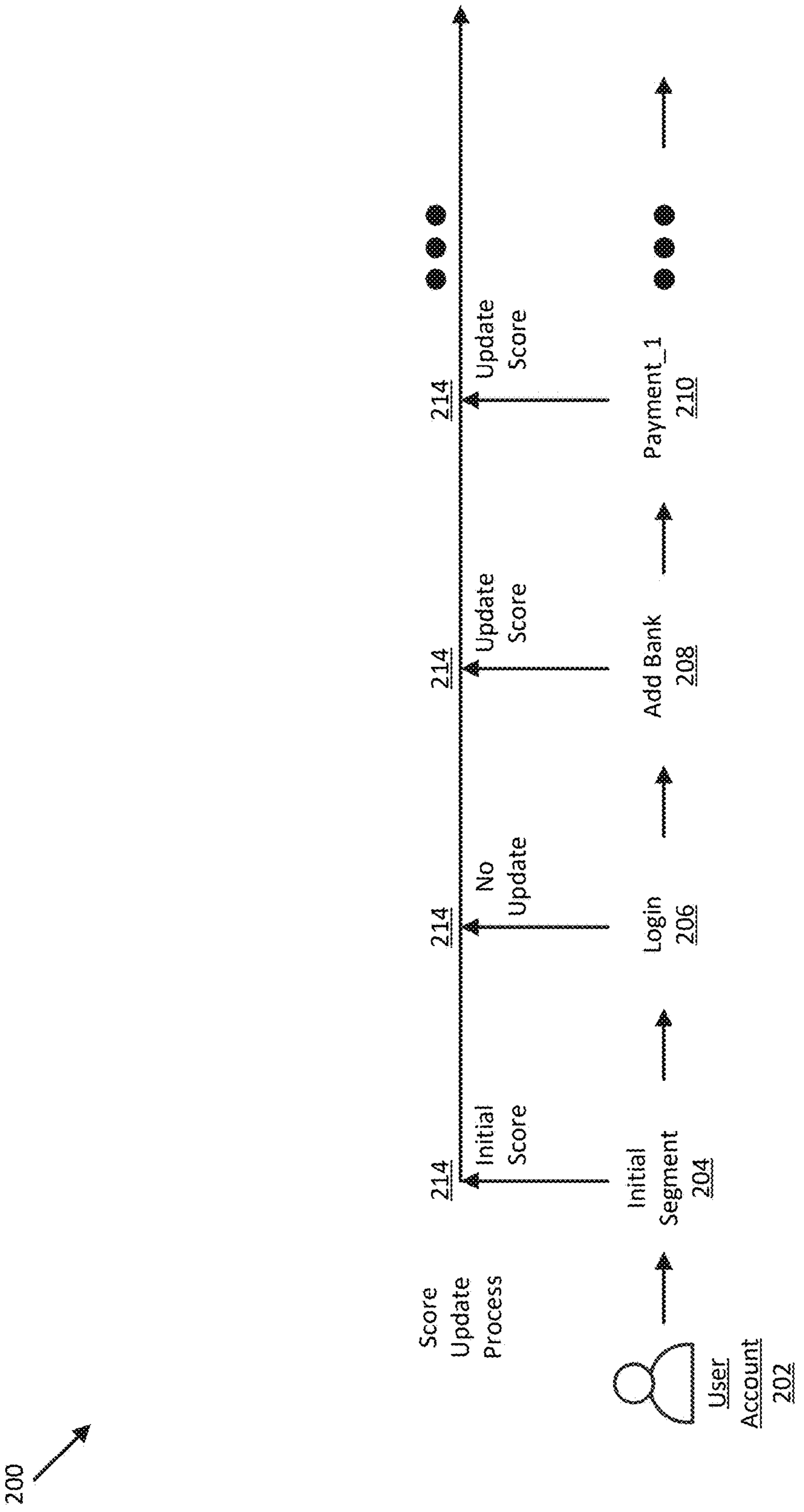
FIG. 2 shows an example user account life cycle in accordance with one or more embodiments of the present disclosure.

FIG. 2 illustrates an example lifecycle 200 of a user account 202 in which a lifetime score 214 for the user account is updated at various assessment checkpoints in accordance with one or more embodiments of the present disclosure. At an initial segment 204, the computer system may provide an initial score for the lifetime score 214, which may be a default score or may be a score computed based on account registration information such as the customer segment and a geolocation information for the user account. In some cases, such account registration information may be included as one or more variables in the lifetime score model discussed in reference to FIG. 1. In some embodiments, the initial score may be a starting point where the user account 202 has not yet achieved a high value for the electronic service provider.

In the embodiment shown in FIG. 2, for certain user account activities such as a login event 206, there may be no update made to the lifetime score 214. However, in other embodiments, at the login event 206, the computer system may compute an update for the lifetime score 214 for the login event 206.

As discussed above, in some embodiments, the computer system may provide the previous lifetime score 214 at certain assessment checkpoints such as the assessment checkpoint for the login event 206, which may be used to adjust processing rules. For example, at login event 206, instead of updating the lifetime score 214, the computer system may provide the lifetime score 214 to a decision engine and/or risk assessment system associated with the assessment checkpoint at the login event 206, which could be used at the assessment checkpoint to reduce friction for the user experience of the user account 202. For example, where the user account 202 has a lifetime score that exceeds a certain threshold indicating the user is a high value user account for the electronic service provider, the computer system may abstain from executing, or prevent, certain actions at the login event 206. For example, the login event 206 may normally require that a security challenge be completed by the user at the login event 206 after entering the appropriate credentials for the user account 202, however, since the user account 202 has a lifetime score 214 that indicates that the user account is of high value for the electronic service provider, the security challenge may be removed or made easier for the user. For example, the security challenge may be made easier by using automated two-factor authentication in which a one-time password text message is sent by the computer system to a mobile device for the user account 202, which can be used to automatically complete the security challenge, rather than requiring the user to answer a security question for the user account 202 based on information provided by the user at account setup.

At an add bank account information event 208, the lifetime score 214 may be further updated based on an assessment checkpoint at the add bank account information event 208. For example, a risk score that is computed at an assessment checkpoint that is triggered by the add bank account information event 208 may also be used as a data input in the lifetime score model to update the lifetime score 214.

At a payment event 210, the lifetime score 214 may further be updated based on an assessment checkpoint associated with the payment event 210. For example, a risk score associated with the assessment checkpoint at the payment event 210 may also be used in the lifetime score model to update the lifetime score 214.

The lifetime score 214 may allow for real-time adjustments to be made for processing rules when there is quick succession user account activity. For example, consider a scenario in which event 208 and event 210 occur very quickly in succession. Under conventional systems, a risk score calculated at an assessment checkpoint for each event is generally computed in a siloed fashion, which does not provide for a holistic view of the user account that can be used by other assessment checkpoints. By computing a lifetime score 214 and updating the lifetime score at event 208, it may be possible for the updated lifetime score 214 to affect how the processing rule(s) at the assessment checkpoint for event 210 will process the event 210. For example, the event 208 may result in an updated lifetime score 214 that indicates the user account is now a high value user account for the electronic service provider. Thus, at event 210, a response threshold for a processing rule at event 210, which may under normal circumstances cause the event 210 to be rejected because of a calculated risk score at the assessment checkpoint, may be adjusted so that the event 210 is now approved and processed. Therefore, the lifetime model score systems and methods discussed herein provide for real-time electronic processing adjustments that allow for disparate assessment checkpoints to operate under a holistic analysis of a user account.

Figure 3:
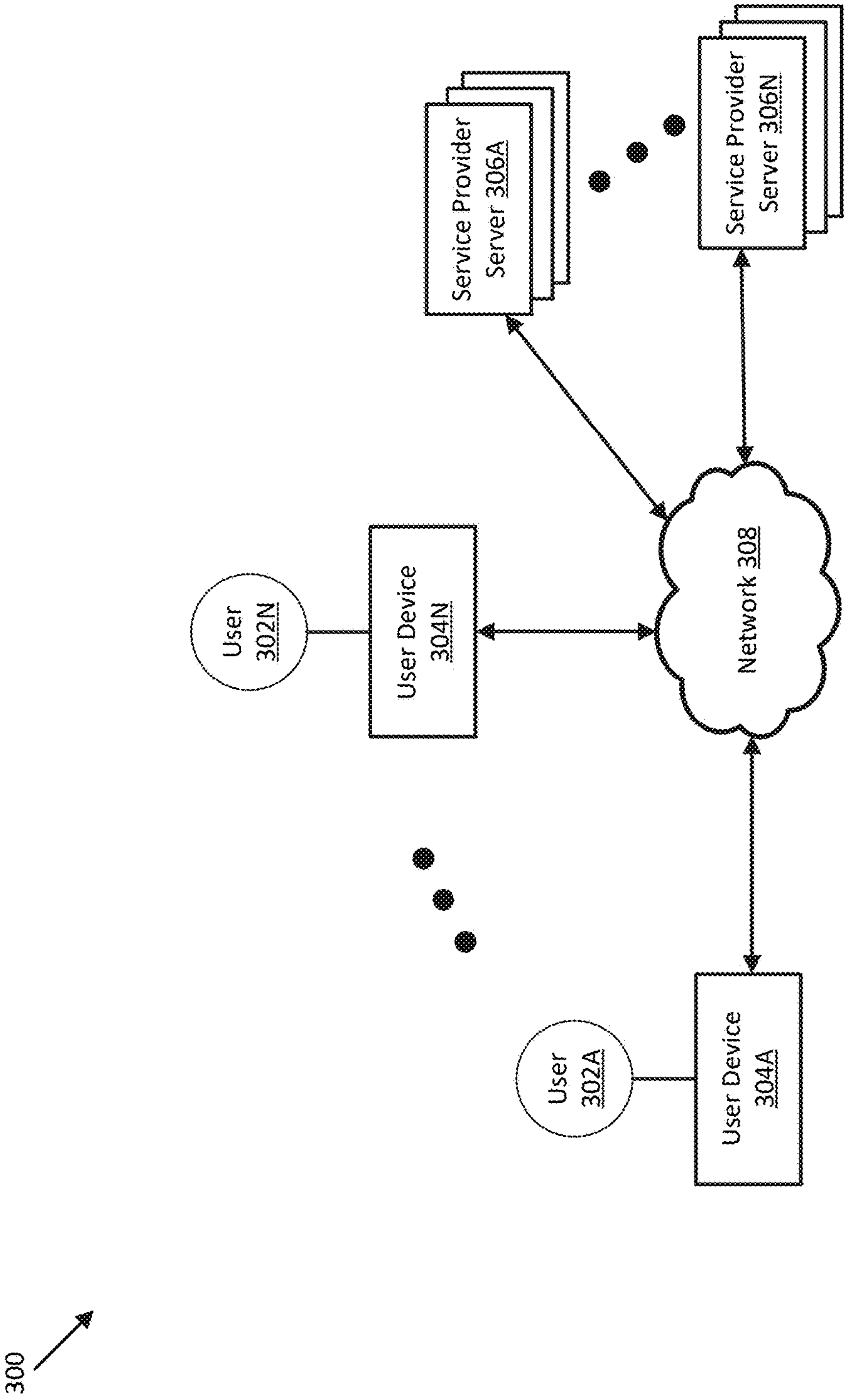
FIG. 3 illustrates a block diagram of a networked system in accordance with one or more embodiments of the present disclosure is illustrated.

Referring now to FIG. 3, a block diagram of a networked system 300 configured to facilitate one or more processes in accordance with various embodiments of the present disclosure is illustrated. System 300 includes user devices 304A-304N and electronic service provider servers 306A-306N. A user 302A is associated with user device 304A, where user 302A can provide an input to service provider servers 306A-306N using user device 304A. Users 302A+1 through 302N may be associated with user devices 304A+1 through 304N, where users 302A+1 through 302N can provide an input to service provider servers 306A-306N using their respective user device.

User devices 304A-304N and service provider servers 306A-306N may each include one or more processors, memories, and other appropriate components for executing instructions such as program code and/or data stored on one or more computer-readable mediums to implement the various applications, data, and operations described herein. For example, such instructions may be stored in one or more computer-readable media such as memories or data storage devices internal and/or external to various components of system 300, and/or accessible over a network 308. Each of the memories may be non-transitory memory. Network 308 may be implemented as a single network or a combination of multiple networks. For example, in various embodiments, network 308 may include the Internet or one or more intranets, landline networks, and/or other appropriate types of networks.

User device 304A may be implemented using any appropriate hardware and software configured for wired and/or wireless communication over network 308. For example, in some embodiments, user device 304A may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 304A may include one or more browser applications which may be used, for example, to provide a convenient interface to facilitate responding to requests over network 308. For example, in one embodiment, the browser application may be implemented as a web browser configured to view information available over the internet and respond to requests sent by service provider servers 306A-306N. User device 304A may also include one or more toolbar applications which may be used, for example, to provide client-side processing for performing desired tasks in response to operations selected by user 302A. In one embodiment, the toolbar application may display a user interface in connection with the browser application.

User device 304A may further include other applications as may be desired in particular embodiments to provide desired features to user device 304A. For example, the other applications may include an application to interface between service provider servers 306A-306N and the network 308, security applications for implementing client-side security features, programming client applications for interfacing with appropriate application programming interfaces (APIs) over network 308, or other types of applications. In some cases, the APIs may correspond to service provider servers 306A-306N. The applications may also include email, texting, voice, and instant messaging applications that allow user 302A to send and receive emails, calls, and texts through network 308, as well as applications that enable the user 302A to communicate to service provider servers 306A-306N. User device 304A includes one or more device identifiers which may be implemented, for example, as operating system registry entries, cookies associated with the browser application, identifiers associated with hardware of user device 304A, or other appropriate identifiers, such as those used for user, payment, device, location, and or time authentication. In some embodiments, a device identifier may be used by service provider servers 306A-306N to associate user 302A with a particular account maintained by the service provider servers 306A-306N. A communications application with associated interfaces facilitates communication between user device 304A and other components within system 300. User devices 304A+1 through 304N may be similar to user device 304A.

Service provider servers 306A-306N may be maintained, for example, by corresponding online service providers, which may provide electronic transaction services in some cases. In this regard, service provider servers 306A-306N may include one or more applications which may be configured to interact with user devices 304A-304N over network 308 to facilitate the electronic transaction services. Service provider servers 306A-306N may maintain a plurality of user accounts (e.g., stored in a user account database accessible by service provider servers 306A-306N), each of which may include account information associated with individual users, and some of which may have linked tokens as discussed herein. Service provider servers 306A-306N may perform various functions, including communicating over network 308 with each other, and in some embodiments, a payment network and/or other network servers capable a transferring funds between financial institutions and other third-party providers to complete transaction requests and process transactions.

Figure 4:
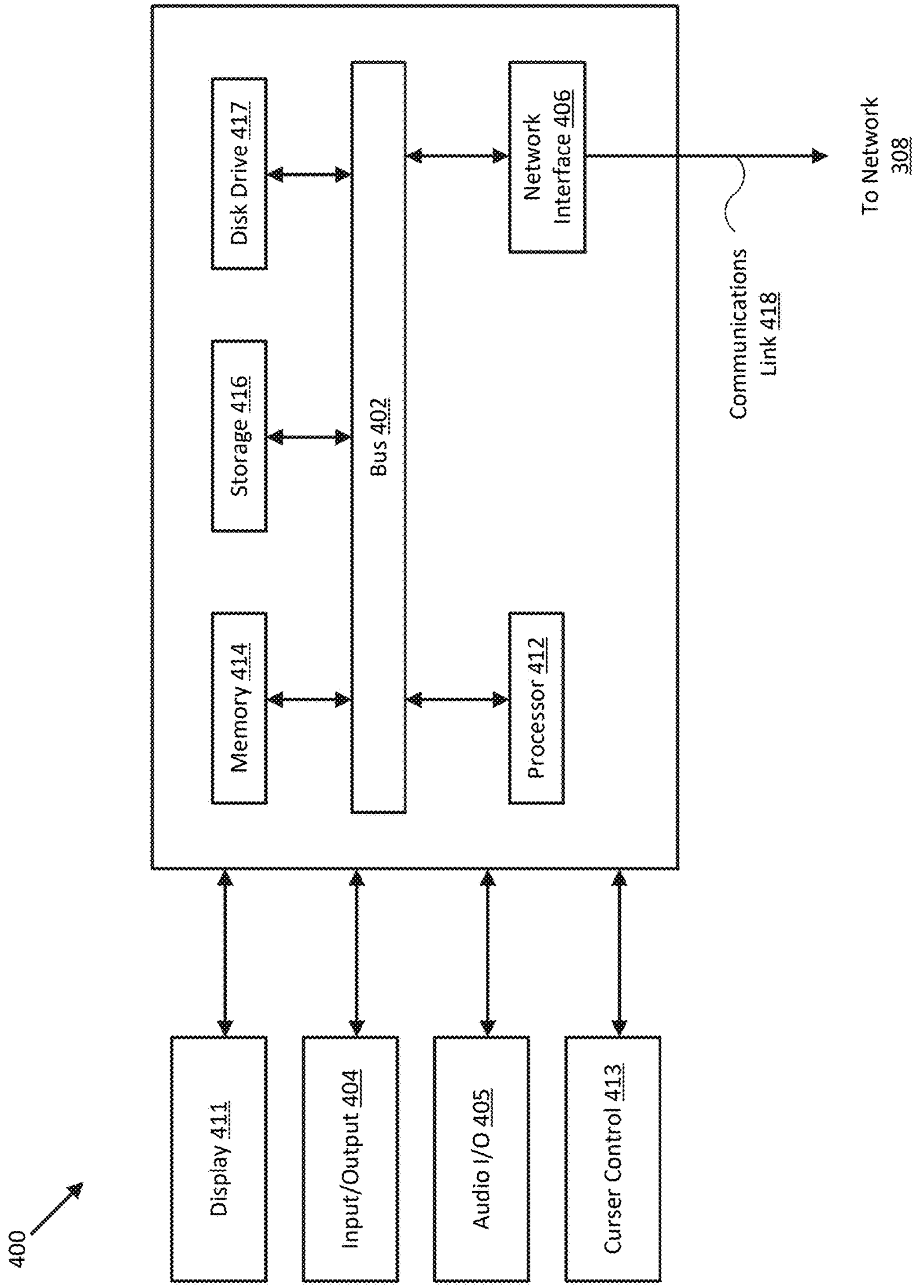
FIG. 4 illustrates a block diagram of a computer system implemented in accordance with one or more embodiments of the present disclosure.

FIG. 4 illustrates a block diagram of a computer system 400 suitable for implementing one or more embodiments of the present disclosure. It should be appreciated that each of the devices utilized by users, entities, and service providers discussed herein (e.g., the computer system) may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). I/O component 404 may further include NFC communication capabilities. An optional audio I/O component 405 may also be included to allow a user to use voice for inputting information by converting audio signals. Audio I/O component 405 may allow the user to hear audio. A transceiver or network interface 406 transmits and receives signals between computer system 400 and other devices, such as another user device, an entity server, and/or a provider server via network 308. In one embodiment, the transmission is wireless, although other transmission mediums and methods may also be suitable. Processor 412, which may be one or more hardware processors, can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer-readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network 308 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A method, comprising:

receiving, by a transaction processing system, a request from a user to process an electronic transaction, wherein the user has an account with the transaction processing system;

accessing, based on the request, an assessment checkpoint, the assessment checkpoint comprising information associated with the account, the account being used to conduct a plurality of previous transactions over a previous time period;

determining, based on the information associated with the account of the user, whether an aggregate value of the plurality of previous transactions conducted over the previous time period exceeds a specified value threshold;

adjusting, based on the determining, a risk threshold for the user;

generating, for the user, a risk score that indicates a risk associated with processing the electronic transaction;

comparing the risk score with the adjusted risk threshold; and determining whether to process the electronic transaction based on a result of the comparing.

2. The method of claim 1, further comprising: transforming the information associated with the account into a plurality of weighted variables, and wherein the risk score is generated at least in part based on the plurality of weighted variables.

3. The method of claim 1, wherein:

the aggregate value was determined to exceed the specified value threshold;

the risk threshold is adjusted to have a greater value;

the risk score is compared against the greater value of the risk threshold; and the electronic transaction is determined to be processed based on a result of the risk score being compared against the greater value of the risk threshold.

4. The method of claim 3, wherein:

the electronic transaction is processed when the risk score is below the greater value of the risk threshold; and the risk score is above the risk threshold before the risk threshold is adjusted but below the risk threshold after the risk threshold is adjusted.

5. The method of claim 4, further comprising moving, based on the risk score being below the greater value of the risk threshold, the electronic transaction to a faster processing queue.

6. The method of claim 4, wherein the risk score is above the risk threshold after the risk threshold is adjusted, wherein the method further comprises prompting the user to provide additional information, and wherein the determining whether to process the electronic transaction is further based on the additional information provided by the user.

7. The method of claim 6, wherein the additional information comprises an additional security challenge.

8. The method of claim 3, further comprising automatically processing the electronic transaction in an absence of receiving further input from a human.

9. The method of claim 1, wherein the assessment checkpoint comprises one or more operations to assess, based on one or more criteria, whether a prospective transaction is fraudulent.

10. The method of claim 1, wherein the risk score comprises one or more of: a transaction risk score, an Internet Protocol (IP) address risk score, a mobile phone risk score, an emulator risk score, a fake email risk score, or a geolocation risk score.

11. The method of claim 1, wherein the risk score is generated by a decision engine in real-time.

12. The method of claim 1, wherein:

the risk threshold comprises a first sub-threshold and a second sub-threshold greater than the first sub-threshold; and the determining whether to process the electronic transaction comprises:

automatically processing the electronic transaction when the risk score is below the first sub-threshold, automatically denying the electronic transaction when the risk score is above the second sub-threshold, or requiring the user to complete an additional authentication before the electronic transaction is processed.

13. The method of claim 1, wherein the assessment checkpoint is triggered in response to receiving the request to process the electronic transaction, and wherein the assessment checkpoint is further configured to be triggered in response one or more of the following events: a login to the account of the user, a communication by the user with an the transaction processing system, a change of a profile of the user, an addition or a modification of a funding instrument associated with the account of the user, or a deposit or a withdrawal of funds in the account of the user.

14. A system of a service provider, comprising:

a non-transitory memory storing instructions; and a processor configured to execute the instructions to cause the system to perform operations comprising:

accessing an electronic transaction that involves an user;

retrieving a transaction history of the user over a specified time period;

determining, based on the transaction history, that a value of the user to the service provider exceeds a specified threshold;

evaluating a risk of processing the electronic transaction at least in part by calculating a risk score of processing the electronic transaction with a risk threshold, wherein the risk threshold has been adjusted upwards or the risk score has been adjusted downwards based on the determining that the value of the user to the service provider exceeds the specified threshold; and automatically processing the electronic transaction when the risk score is less than the risk threshold.

15. The system of the service provider of claim 14, wherein the risk score is calculated at least in part by transforming information associated with the electronic transaction into a plurality of weighted variables.

16. The system of the service provider of claim 14, wherein the transaction history comprises a monetary amount of each previous electronic transaction conducted by the user over the specified time period, and wherein the value of the user is associated with an aggregate monetary amount of the previous electronic transactions conducted by the user over the specified time period.

17. The system of the service provider of claim 14, wherein the risk score is further associated with one or more of: an Internet Protocol (IP) address risk, a mobile phone risk, an emulator risk, a fake email risk, or a geolocation risk.

18. A non-transitory machine-readable medium having instructions stored thereon, the instructions executable to cause a machine to perform operations comprising:

accessing a security checkpoint that has been triggered by an activity associated with a first user;

analyzing data associated with the first user, the data comprising monetary information of previous interactions of the first user with a second user;

determining, based on the analyzing, that a value of the first user to the second user exceeds a specified threshold;

adjusting, based on the determining:

a risk score calculated for the activity of the first user by decreasing the risk score; or a risk threshold by increasing the risk threshold;

comparing, after the adjusting, the risk score with the risk threshold; and performing an action based on a result of the comparing.

19. The non-transitory machine-readable medium of claim 18, wherein the operations further comprise calculating the risk score at least in part by transforming at least a portion of the data into a plurality of weighted variables.

20. The non-transitory machine-readable medium of claim 18, wherein:

the activity comprises an electronic transaction;

the result of the comparing indicates that, after the adjusting, the risk score is lower than the risk threshold; and the action is performed by automatically processing the electronic transaction.

* * * * *